United States Patent
Preimesberger et al.

(10) Patent No.: US 11,875,170 B2
(45) Date of Patent: Jan. 16, 2024

(54) CONTROLLING SCREEN VIDEO DISPLAY VIA A MANAGEABILITY CONTROLLER

(71) Applicant: Hewlett Packard Enterprise Development LP, Houston, TX (US)

(72) Inventors: Lee A. Preimesberger, Houston, TX (US); Jorge Cisneros, Houston, TX (US); Vartan Yosef Kasheshian, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 597 days.

(21) Appl. No.: 16/937,413

(22) Filed: Jul. 23, 2020

(65) Prior Publication Data
US 2022/0027186 A1   Jan. 27, 2022

(51) Int. Cl.
*G06F 9/455* (2018.01)
*G06F 3/14* (2006.01)

(52) U.S. Cl.
CPC ........ *G06F 9/45558* (2013.01); *G06F 3/1454* (2013.01); *G06F 2009/45562* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| 8,375,115 | B2 | 2/2013 | Partani et al. |
| 9,158,564 | B2 | 10/2015 | Maity et al. |
| 10,372,400 | B2 | 8/2019 | Emerson et al. |
| 10,506,013 | B1 | 12/2019 | Brown et al. |
| 2006/0036775 | A1* | 2/2006 | Levit-Gurevich ............ G06F 9/45537 710/1 |
| 2011/0161482 | A1 | 6/2011 | Bonola et al. |
| 2015/0116310 | A1* | 4/2015 | Baudouin ............... G06F 9/544 345/419 |
| 2018/0227340 | A1* | 8/2018 | Jaynes ..................... H04N 7/15 |
| 2019/0044793 | A1 | 2/2019 | Chew |

OTHER PUBLICATIONS

Cisco, "Starting the KVM," Cisco UCS Manager GUI Configuration Guide, Feb. 9, 2014, pp. 1-6, Release 1.4.

* cited by examiner

*Primary Examiner* — Lewis A Bullock, Jr.
*Assistant Examiner* — Melissa A Headly
(74) *Attorney, Agent, or Firm* — Trop, Pruner & Hu, P.C.

(57) ABSTRACT

Examples described herein relate to a manageability controller for controlling a display of a screen video. The manageability controller may receive screen video data from a hypervisor running on a host operating system (OS) that is executable by a main processing resource separate from the manageability processing resource. The screen video data may include a host OS screen video data corresponding to the host OS, a virtual machine (VM) screen video data corresponding to a VM running on the hypervisor, or both. Further, the manageability controller may store the host OS screen video data or the VM screen video data in a physical video memory based on a screen selection input.

16 Claims, 5 Drawing Sheets

CONTROLLING SCREEN VIDEO DISPLAY VIA A MANAGEABILITY CONTROLLER

BACKGROUND

Virtual machines (VMs) have gained popularity in several computing and storage applications owing to enhanced partitioning, encapsulation, isolation, and hardware independence, for example. Typically, to access and/or manage VMs hosted on a computing system, a user may open a VM management application and locate the VM via a graphical user interface (GUI) or a command line interface (CLI) enabled via the VM management application.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
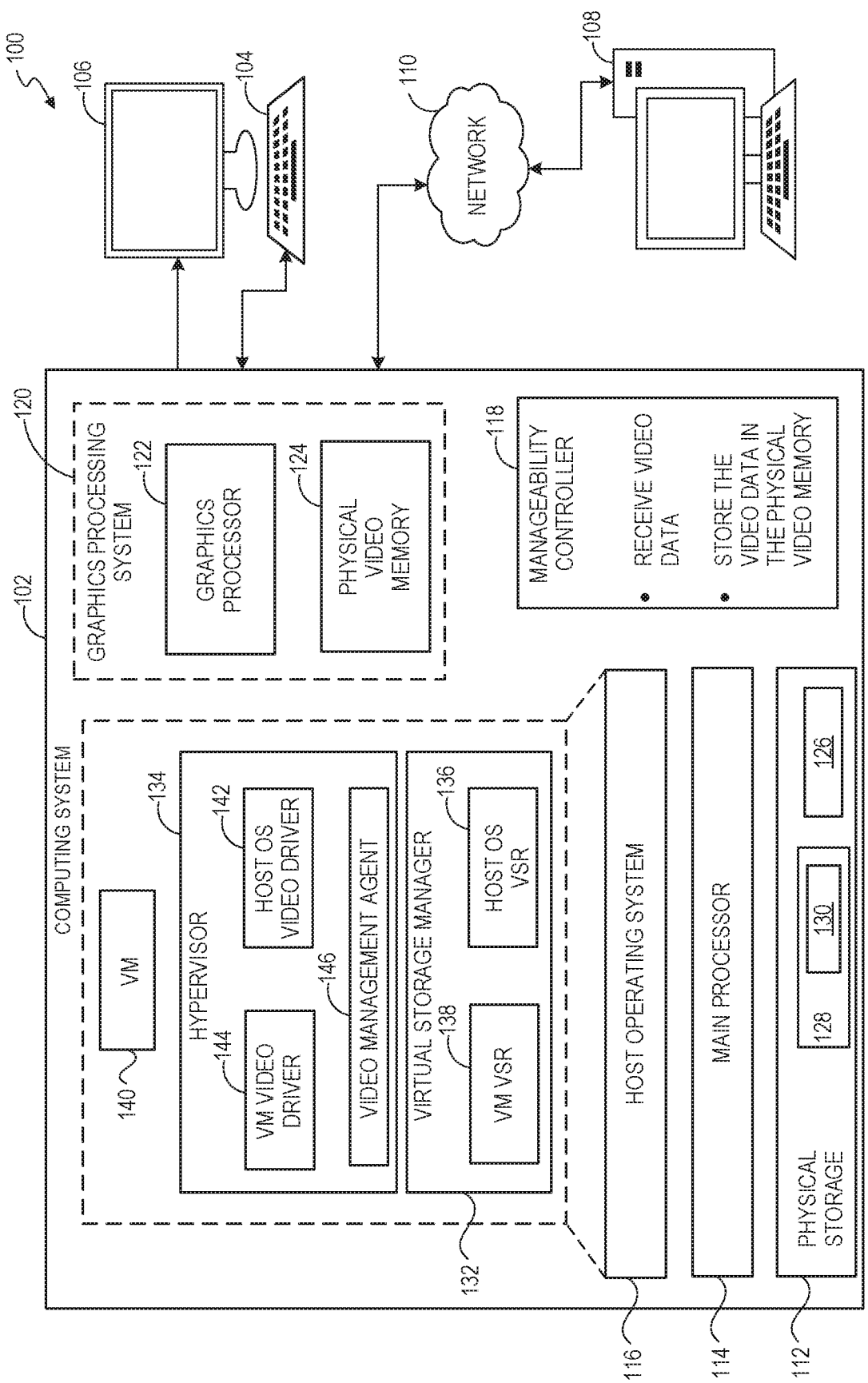
FIG. 1 depicts a computing infrastructure including a computing system, in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

A virtual machine (VM) may be an instance of an operating system hosted in a computing system via a hypervisor. Further, the hypervisor may also serve as a platform to create and manage the VMs. Typically, to access and/or manage VMs hosted on the computing system, a user may open a VM management application (e.g., VMware vSphere) and locate the VM via a graphical user interface (GUI) or a command line interface (CLI) enabled via the VM management application.

The UM management application may also provide an option to view a screen video of the VMs hosted on the computing system. Accordingly, when the user accesses a given VM to view corresponding screen video, a video stream is displayed on the visual output device (e.g., a display/monitor) associated with the computing device. In fact, in the background when the given VM is accessed to view its screen video, a video data corresponding to the given VM is loaded into a physical video memory by a host operating system (OS) running the hypervisor. The graphics processor may access the physical video memory and display a video on the visual output device of the computing system. Accordingly, the user may in-turn see the screen video of the given VM (hereinafter referred to as a UM screen video) on the visual output device when the user selects to view the UM screen video via the VM management application. Further, when the user accesses various programs running on the host OS, a screen video of the host OS may be loaded in the physical video memory by the host OS which may then be displayed on the visual output device. The video data displayed on the visual output device is hereinafter referred to as primary video which may be either of the screen video of the host OS or the UM screen video.

Typically, a computing system includes a processing resource that executes the host OS. The processing resource executing the host OS is hereinafter referred to as a main processing resource. In some examples, certain computing systems may be equipped with a manageability controller to implement various accessibility services for the computing system. Typically, the manageability controller may be implemented using another processing resource that is separate from the main processing resource executing the host OS. The manageability controller may also provide remote management access (e.g., system console access) regardless of whether the computing system is powered on, whether a primary subsystem hardware of the computing system is functioning. For example, the manageability controller may enable a web-based console (e.g., user interface), hereinafter referred to as web-console, using which a user can access the computing systems for various functionalities offered by the manageability controller.

In certain examples, the manageability controller may have read access to the physical video memory. Further, the manageability controller may also facilitate an option for an authorized user to view a screen video (e.g., the primary video) of the computing system. Accordingly, the manageability controller can display the screen video of the computing system on the web-console based on video data stored in the physical video memory. As previously noted, in traditional implementations, the data stored in the physical video memory is controlled via the host OS and the data corresponds to any of the screen video of the host OS or the VM, where the VM is to be accessed via the VM management application to view the VM screen video. Accordingly, in order to view the VM screen video on the web-console enabled by the manageability controller or the visual output device of the computing system, one has to first access the VM via the VM management application. Currently, a user cannot switch between the screen video of the host OS and the screen videos of VMs hosted on the computing system, on the web-console or on the local visual output device, unless the VMs are accessed via the VM management application.

To that end, in accordance with aspects of the present disclosure, a manageability controller is enhanced with a write access to the physical video memory while the host OS is freed from communicating with the physical video memory. Also, in some examples, a screen video data of the host OS (hereinafter referred to as host OS screen video data) may also be virtualized and stored in a virtual memory in similar fashion as a screen video data of a VM (hereinafter referred to as VM screen video data). The manageability controller may receive a screen video data from a hypervisor running on a host operating system (OS). The screen video data may include the host OS screen video data and the VM screen video data, or both. Further, the manageability controller may store the host OS screen video data or the VM screen video data in a physical video memory based on a screen selection input.

As will be appreciated, in accordance with the aspects of the present disclosure, the manageability controller may decide what is loaded in the physical video memory based on the screen selection input. Moreover, since the manageability controller is in control of selection of the screen video data, the manageability controller can also display the selected screen video data on the web-console enabled by the manageability controller. Advantageously, a user, remotely from the web-console or locally at the computing system, can access screen videos corresponding to any of the host OS or the VM without using any VM management application. As such, the manageability controller, in some examples, may enable the user to switch between different screen videos.

Referring now to the drawings, in FIG. 1, a computing infrastructure 100 is depicted, in accordance with an example. The computing infrastructure 100 may include a computing system 102 that may be accessible to a user via input/output media such as, but not limited to, a keyboard 104 and a display 106. Further, the computing system 102 may also be accessible from a remote computing system 108 over a network 110. In some examples, the computing system 102 may include any electronic device capable of storing data, processing data, and/or communicating data with external devices over the network 110. Examples of the computing system 102 may include, but are not limited to, a server, a storage device, a network switch, a router, a mobile communication device, a desktop computer, a portable computer, a computing system resource enclosure, or a WLAN access point. The server may be a blade server, for example. The storage device may be a storage blade, for example. Further, in some examples, the computing system enclosure may be a blade enclosure housing one or more blades (e.g., blade servers, storage blades, etc.).

Further, although the keyboard 104 and the display 106 are shown as two separate devices in the computing infrastructure 100 of FIG. 1, in some examples, the functionalities of the keyboard 104 and the display 106 may be combined into a single input-output device, for example, a touch sensitive display without limiting the scope of the present specification. Moreover, although not shown in FIG. 1, the computing system 102 may also be accessed via various other types of input devices including, but not limited to, mouse, voice assisted input device, a gesture based input device, and display devices such as, but not limited to, projectors. Additionally, the remote computing system 108 may be any electronic device capable connecting to the network 110, although the remote computing system 108 is displayed as a desktop computer, for example. Examples of the computing system 102 may include, but are not limited to, a server, a desktop computer, a portable computer, a smartphone, and the like.

The remote computing system 108 may access the computing system 102 via the network 110. Examples of the network 110 may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. Communication over the network 110 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network 110 may be enabled via a wired (e.g., copper, optical communication, etc.) or wireless (e.g., Wi-Fi®, cellular communication, satellite communication, Bluetooth, etc.) communication technologies. In some examples, the network may be enabled via private communication links including, but not limited to, communication links established via Bluetooth, cellular communication, optical communication, radio frequency communication, wired (e.g., copper), and the like. In some examples, the private communication links may be direct communication links between the computing system 102 and the remote computing system 108.

Further, in some examples, the computing system 102 may include one or more of a physical storage 112, a processing resource (hereinafter referred to as a main processing resource) 114, a host operating system (OS) 116 executing on the main processing resource 114, a manageability controller 118, and a graphics processing system 120 including a graphics processor 122 and a physical video memory 124. The physical storage 112 may include one or more physical storage devices such as a physical storage device 126 to store data and/or executable instructions. Examples of the physical storage device 126 may include, but are not limited to, a random access memory (RAM), a read-only memory (ROM), an electrically erasable programmable read-only memory (EEPROM), a flash memory, a hard disk drive, solid-state drive (SSD), etc. In some examples, the physical storage 112 may also include a specific storage space, hereinafter referred to as host OS memory 128 defined in the physical storage device 126 to store program instructions and data corresponding to the host OS 116. The host OS memory 128 may include a kernel memory 130 to store data pertaining to various applications executing on the host OS 116 and corresponding hardware resource allocations.

Further, the main processing resource 114 may be a physical device, for example, one or more central processing unit (CPU), one or more semiconductor-based microprocessors, application-specific integrated circuit (ASIC), a field programmable gate array (FPGA), other hardware devices capable of retrieving and executing the host OS 116. In some examples, the microprocessors may include single processing core or multiple processing cores. As an alternative, the main processing resource 114 may include at least one integrated circuit (IC), control logic, electronic circuits, or combinations thereof that include a number of electronic components for performing the functionalities intended to be performed by the computing system 102. The host OS 116 may enable the user to utilize various capabilities (e.g., compute, storage, and/or networking) of the computing system 102 without knowledge of machine-level programming language. Further, the host OS 116 may serve as a platform for executing various programs on the computing system 102. Examples of the host OS 116 may include, but are not limited to, Windows OS, Linux OS, Android OS, Mac OS, iOS, or Chrome OS.

In some examples, the host OS 116 may run various programs such as a hypervisor 132 and a storage virtualization program, for example, a virtual storage manager 134. The virtual storage manager 134 may create a virtualized storage (e.g., virtual volumes or virtual disks) that may include aspects (e.g., addressing, configurations, etc.) abstracted from data stored in the physical storage 112 of the computing system 102. The virtualized storage may be presented to a user environment (e.g., virtual machines and/or various application executing on the host OS 116) hosted on the computing system 102 and outside of the computing system 102 with access permissions. In some examples, the virtual storage manager 134 may present virtual volumes to the user environment as one or more logical unit numbers (LUNs, not shown). Further, in some examples, the virtual storage manager 134 may also provide data services such as deduplication, compression, replication/cloning, and the like.

In the example of FIG. 1, the virtual storage manager 134 is shown to have created two virtual storage regions (VSRs)—a first "virtual storage region" (VSR) hereinafter referred to as a host OS VSR 136 and a second VSR hereinafter referred to as a VM VSR 138. The host OS VSR 136 and the VM VSR 138 may be assigned separate corresponding physical storage space in the kernel memory 130 associated with the host OS 116. In one example, the host OS VSR 136 and the VM VSR 138 may reside in a same virtual volume. In another example, the host OS VSR 136 and the VM VSR 138 may reside in separate virtual volumes. Further, in some examples, the storage, retrieval, and/or purging of the data in the host OS VSR 136 and the VM VSR 138 may be controlled via the hypervisor 132.

The hypervisor 132 may be a computer program, firmware, or a hardware that may facilitate hosting of one or more operating system instances, hereinafter referred to as virtual machine (VM), on a common processing resource (e.g., the main processing resource 114). In the example of FIG. 1, although the hypervisor 132 is shown as being a type-2 hypervisor, in some other examples, the hypervisor 132 may be a type-1 hypervisor. Accordingly, the hypervisor 132 may serve as a mother operating system for the virtual machine. In the example of FIG. 1, the hypervisor 132 is shown to host a virtual machine 140. Although a VM 140 is shown in FIG. 1, more than one VMs may be hosted by the hypervisor 132, without limiting the scope of the present disclosure. Moreover, in accordance with aspects of the present disclosure, the hypervisor 132 may manage storage of screen video data corresponding to the VM 140 as well as the host OS 116. The term "screen video data" may refer to a data that to be displayed for an entity (e.g., the host OS 116 or the VM 140) on a display device such as the display 106 associated with the computing system 102. A screen video data corresponding to the host OS 116 is hereinafter referred to as a host OS screen video data. Further, a screen video data corresponding to the VM 140 is hereinafter referred to as a VM screen video data.

In order to manage the host OS screen video data and the VM screen video data, the hypervisor 132 may include one or more drivers, for example, a host OS video driver 142 and a VM video driver 144. Each of the host OS video driver 142 and the VM video driver 144 may represent a set of program instructions that are executable by the main processing resource 114 of the computing system 102. For example, the host OS video driver 142, when executed by the main processing resource 114, may obtain the host OS screen video data from the host OS 116 and store the host OS screen video data in the host OS VSR 136. As previously noted, the host OS VSR 136 is a virtual storage space. Accordingly, the storage of the host OS screen video data into the host OS VSR 136 virtualizes the host OS screen video data. Further, in some examples, the VM video driver 144, when executed by the main processing resource 114, may obtain the VM screen video data from the VM 140 and store the VM screen video data in the VM VSR 138. Although, in the example of FIG. 1, the host OS video driver 142 and the VM video driver 144 are shown as two separate modules, in certain other examples, functionalities of the host OS video driver 142 and the VM video driver 144 may be combined in a single module executable by the main processing resource 114.

Moreover, in some examples, the hypervisor 132 may also include a video management agent 146. The video management agent 146 may represent a set of program instructions that are executable by the main processing resource 114 of the computing system 102. Alternatively, in some examples, the video management agent 146 may include hardware including, but not limited, a microprocessor or electronic circuits. The video management agent 146 may have access to the screen video data from the host OS VSR 136 and the VM VSR 138. The video management agent 146 may access the host OS screen video data from the host OS VSR 136 and the VM screen video data from the VM VSR 138. Further, the video management agent 146 may send the host OS screen video data and the VM screen video data to the manageability controller 118. In one example, the video management agent 146 may send an entire content of the host OS VSR 136 and the VM VSR 138 to the manageability controller 118. In another example, the video management agent 146 may send screen video data that has been changed from the previously sent data to the manageability controller 118.

Further, in certain other examples, the video management agent 146 may encode the host OS screen video data and the VM screen video data in accordance with a video encoding protocol. Examples of the encoding protocols that may be implemented by the video management agent 146 may include, but are not limited to, any of the Motion Picture Experts Group (MPEG) family of video coding standards; any of H26x family of video coding standards such as but not limited to, H.264 or H.265; VC-1, Theora, VP8, VP9, Daala, and the like.

In addition, in some examples, display of information (e.g., the screen video) on the display 106 may be facilitated via the graphics processing system 120 (sometimes also referred to as a graphics card). The graphics processing system 120 may enable the computing system 102 to produce graphics and images more quickly. To achieve this, the graphics processing system 120 may include the graphics processor 122 and the physical video memory 124. The physical video memory 124 may be a non-transitory storage medium that temporarily stores data to be displayed on the display 106. As new screen video data comes into the graphics processing system 120, the new screen video data may replace the screen video data that is no longer needed in the physical video memory 124. When the computing system 102 is turned off, any screen video data stored in the physical video memory 124 may be removed. The physical video memory 124 may be a Random Access Memory (RAM), including, but not limited to, video RAM (VRAM), window RAM (WRAM), Rambus Dynamic RAM (RDRAM), and synchronous graphics RAM (SDRAM). In some examples, data to be displayed on the display 106 may be stored in the physical video memory 124. The graphics processor 122 may retrieve data from the physical video memory 124 and transform the retrieved data into imagery. The graphics processor 122 may be an electronic circuit including a processor specialized to rapidly manipulate and alter memory to accelerate the creation of images in a frame buffer intended for output to the display 106.

Moreover, in some examples, the computing system 102 may include the manageability controller 118 to implement various accessibility services for the computing system 102. In accordance with the aspects of the present disclosure, the manageability controller 118 may enable a direct keyboard, video, and mouse (KVM) like capability for allowing an access to one or more virtual machines (e.g., the VM 140) and the host OS 116 by controlling display of the screen video data in comparison to conventional systems where a host OS controls the display of the screen video data. In some examples, the host OS 116, in accordance with aspects of the present disclosure, may not store the screen video data into the physical video memory 124. Instead, as previously noted, the host OS screen video data is stored in a virtualized storage, for example, for example, the host OS VSR 136 in a similar fashion as storage of the VM screen video data. Further, the video management agent 146 may send the host OS screen video data and the VM screen video data to the manageability controller 118 instead of the host OS 116 storing screen video data in the physical video memory 124. In particular, in accordance with the aspects of the present disclosure, the host OS 116 is relieved from storing data in the physical video memory 124 while the manageability controller 118 is enabled with write access to the physical video memory 124 and to control what data is to be stored in the physical video memory 124.

The manageability controller 118 may also be referred to as baseboard management controller (BMC), in some examples. The manageability controller 118 may be implemented using a separate processing resource (see FIG. 3) from the main processing resource 114 executing the host OS 116. In some examples, the manageability controller 118 may provide so-called "lights-out" functionality for the computing system 102. For example, the lights-out functionality may allow a user (such as a system administrator) to perform management operations on the computing system 102 even if the host OS 116 is not installed or not functional on the computing system 102. Moreover, in one example, the manageability controller 118 may run on an auxiliary power, thus the computing system 102 need not be powered on to an ON-state where control of the computing system 102 is handed over to the host OS 116 after boot. In some examples, the manageability controller 118 may also have management capabilities for sub-systems (e.g., cooling system) of a computing system 102.

Moreover, in certain examples, the manageability controller 118 may provide so-called "out-of-band" (OOB) services, such as remote console access, remote reboot and power management functionality, monitoring health of the system, access to system logs, and the like. The term OOB services as used herein may refer to any service provided by the manageability controller 118 execution of which does not interfere with instructions or workloads running on the main processing resource 114 of the computing system 102. The manageability controller 118 may include an interface (also referred to as a management channel) such as a network interface, and/or serial interface to enable communication with the manageability controller 118. For example, the manageability controller 118 may provide remote management access (e.g., system console access) from a remote system such as the remote computing system 108 regardless of whether the computing system 102 is powered on, whether a primary subsystem hardware of the computing system 102 is functioning, or whether the host OS 116 is operating or even installed. The user may be able to access various functionalities offered by the manageability controller 118 by accessing a web-console from the remote computing system 108, as well. Certain additional details regarding operations performed by the manageability controller 118 will be described in the description later.

In accordance with the aspects of the present disclosure, the manageability controller 118 may enable a KVM like functionality to access one or more virtual machines and the host OS 116. For example, the manageability controller 118 may enable the user to switch between the screen videos of the host OS 116 and the VM 140 without the user accessing any VM management application and/or the user requiring knowledge about such VM management application. In certain examples, the manageability controller 118 may also enable the user to switch between the screen videos of the multiple VMs and/or the host OS 116 if the hypervisor 132 hosts more than one VM. The manageability controller 118 may receive a screen selection input specifying which screen video data is to be displayed to the user. The screen selection input may be received from an input device such as the keyboard 104 or any other device (e.g., mouse, voice input device, gesture input device, touch input device, and the like) capable of specifying such input. In some examples, the screen selection input may also be received from the web-console enabled by the manageability controller 118 and accessible from the remote computing system 108.

Further, in accordance with the aspects of the present disclosure, the manageability controller 118 may receive the screen video data from the video management agent 146 hosted by the hypervisor 132. In some examples, the screen video data received from the video management agent 146 may include the host OS screen video data corresponding to the host OS 116 and the VM screen video data corresponding to the VM 140, or both. Moreover, the manageability controller 118 may store the host OS screen video data or the VM screen video data in the physical video memory 124 based on a screen selection input. Additional operational and structural details of the manageability controller 118 will be described in conjunction with FIGS. 3-6.

As will be appreciated, in accordance with the aspects of the present disclosure, a screen video data corresponding to the host OS is stored in virtualized storage (e.g., the host OS VSR 136). Further, the hypervisor 132 sends the screen video data to the manageability controller 118. In accordance with the aspects of the present disclosure, the manageability controller 118 decides what is loaded in the physical video memory 124 based on the screen selection input. Moreover, since the manageability controller 118 is in control of selection of the screen video data, the manageability controller 118 can also display the selected screen video data on the web-console enabled by the manageability controller 118. Advantageously, a user, remotely from the web-console or locally at the computing system 102, can access screen videos of any of the host OS 116 or the VM 140 without using any VM management application. As such, the user can switch between the host OS screen video and the VM screen video.

Figure 2:
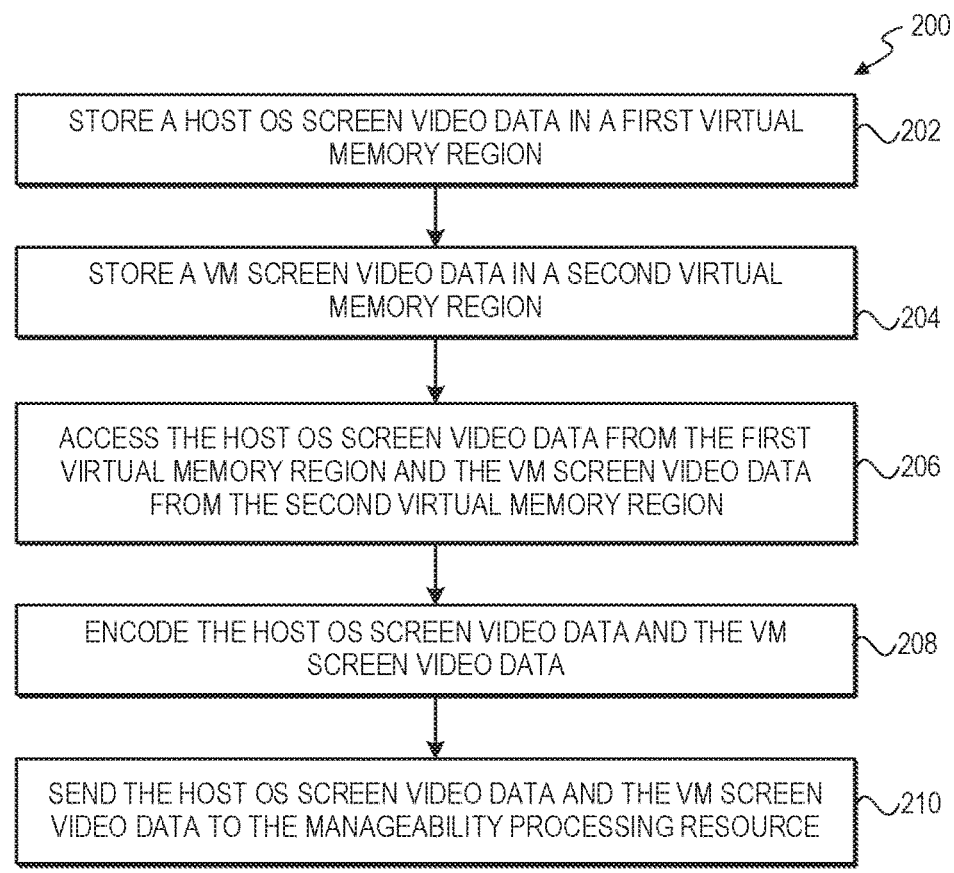
FIG. 2 is a flow diagram depicting a method for handling video data, in accordance with an example.

Referring now to FIG. 2, a flow diagram depicting a method 200 for handling screen video data is presented, in accordance with an example. For illustration purposes, the method 200 will be described in conjunction with the computing system 102 of FIG. 1. The method 200 may include method blocks 202, 204, 206, 208, and 210 (hereinafter collectively referred to as blocks 202-210) which may be performed by a processor-based system, for example, the hypervisor 132 running on the computing system 102. In particular, operations at each of the method blocks 202-210 may be performed by the main processing resource 114 of the computing system 102. At block 202, the host OS video driver 142 may store the host OS screen video data in the host OS VSR 136. Accordingly, the host OS screen video data has been virtualized, as it is stored in a virtual storage enabled by the virtual storage manager 134. Further, at block 204, the VM video driver may store the VM screen video data in the VM VSR 138.

Moreover, at block 206, the video management agent 146 may access the host OS screen video data from the host OS VSR 136 and the VM screen video data from the VM VSR 138. The video management agent 146 may scan the host OS VSR 136 and the VM VSR 138 at regular intervals to access the host OS screen video data and the VM screen video data, respectively. Further, optionally at block 208, the video management agent 146 may encode the host OS screen video data and the VM screen video data in accordance with a video encoding protocol. Additionally, at block 210, the video management agent 146 may send the host OS screen video data and the VM screen video data to the manageability controller 118.

Figure 3:
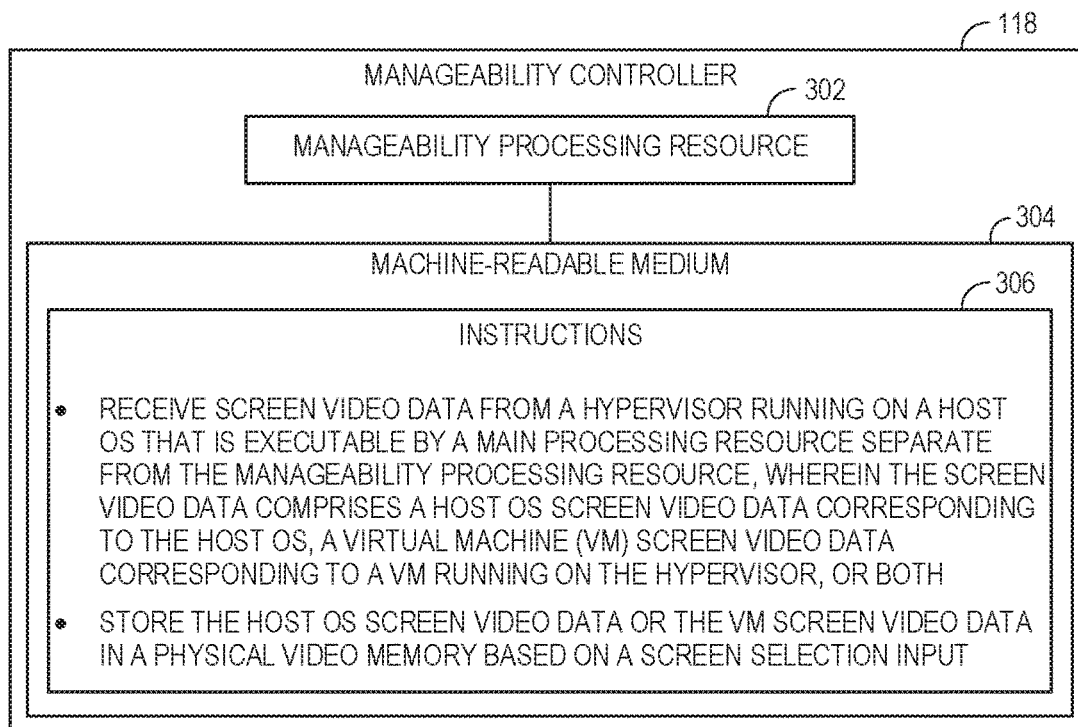
FIG. 3 depicts a manageability controller disposed in the computing system of FIG. 1, in accordance with an example.

Referring now to FIG. 3, a manageability controller such as the manageability controller 118 disposed in the computing system 102 of FIG. 1 is presented, in accordance with an example. As previously noted, the manageability controller 118 be a BMC. In some examples, the manageability controller 118 may include a manageability processing resource 302 and a machine-readable medium 304.

The machine-readable medium 304 may be any electronic, magnetic, optical, or other physical storage device that may store data and/or executable instructions 306. For example, the machine-readable medium 304 may be a Random Access Memory (RAM), an Electrically Erasable Programmable Read-Only Memory (EEPROM), a storage drive, a flash memory, a Compact Disc Read Only Memory (CD-ROM), and the like. The machine-readable medium 304 may be non-transitory. As described in detail herein, the machine-readable medium 304 may be encoded with the executable instructions 306 to perform one or more methods, for example, methods described in FIGS. 4 and 5.

Further, the manageability processing resource 302 may be a physical device, for example, one or more central processing unit (CPU), one or more semiconductor-based microprocessors (single core or multicore), application-specific integrated circuit (ASIC), a field programmable gate array (FPGA), other hardware devices capable of retrieving and executing instructions 306 stored in the machine-readable medium 304, or combinations thereof. The manageability processing resource 302 may fetch, decode, and execute the instructions 306 stored in the machine-readable medium 304 to control display of the host OS screen video data and the VM screen video data on the display 106 and the web-console accessible from the remote computing system 108. As an alternative or in addition to executing the instructions 306, the manageability processing resource 302 may include at least one integrated circuit (IC), control logic, electronic circuits, or combinations thereof that include a number of electronic components for performing the functionalities intended to be performed by the manageability controller 118.

In some examples, the manageability processing resource 302 may execute one or more of the instructions 306 to receive the screen video data from the video management agent 146 hosted by the hypervisor 132. In some examples, the screen video data received from the video management agent 146 may include the host OS screen video data corresponding to the host OS 116 and the VM screen video data corresponding to the VM 140, or both. Moreover, the manageability processing resource 302 may execute one or more of the instructions 306 to store the host OS screen video data or the VM screen video data in the physical video memory 124 based on a screen selection input. Additional details of the operations performed by the manageability processing resource 302 of the manageability controller 118 are described in conjunction with methods described in FIGS. 4 and 5.

Figure 4:
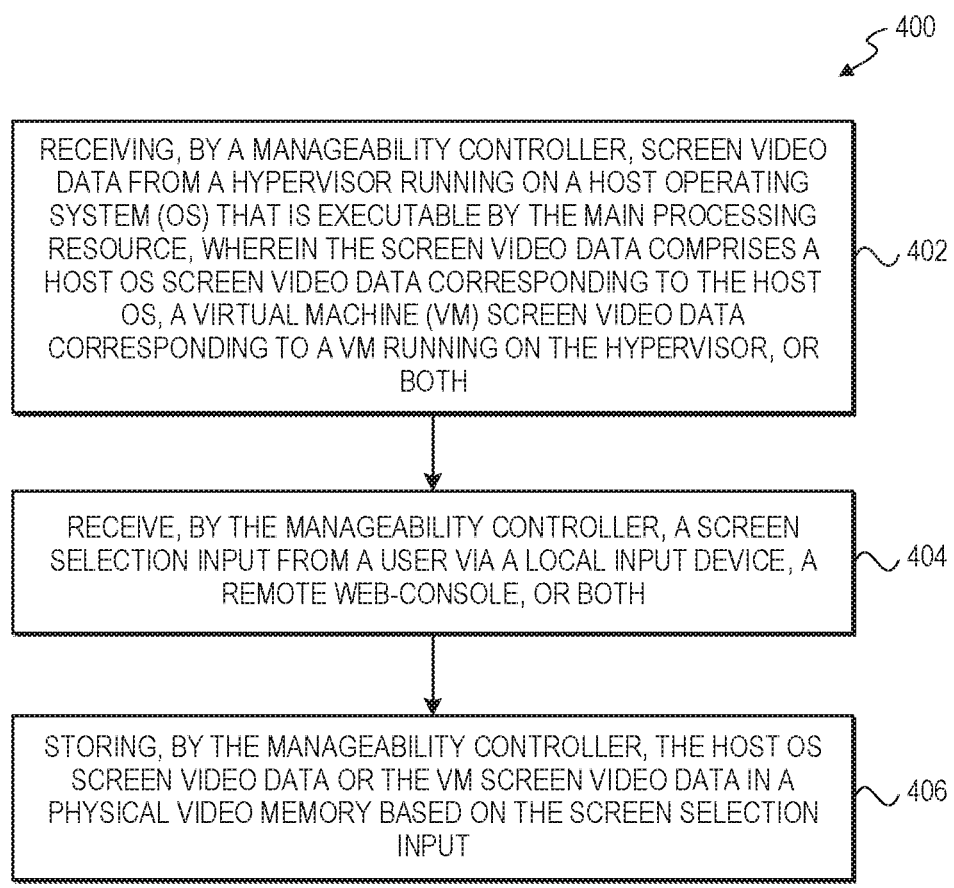
FIG. 4 is a flow diagram depicting a method for controlling a display of a screen video by a manageability controller, in accordance with one example.

Referring now to FIG. 4, a flow diagram depicting a method 400 for controlling a display of the screen video is presented, in accordance with one example. For illustration purposes, the method 400 will be described in conjunction with the computing system 102 of FIG. 1 and the manageability controller of FIG. 3. The method 400 may include method blocks 402, 404, and 406 (hereinafter collectively referred to as blocks 402-406) which may be performed by a processor-based system, for example, the manageability controller 118. In particular, operations at each of the method blocks 402-406 may be performed by the manageability processing resource 302 of the manageability controller 118.

At block 402, the manageability controller 118 may receive screen video data from the hypervisor 132 running on the host OS 116, wherein the screen video data includes the host OS screen video data corresponding to the host OS 116, the VM screen video data corresponding to the VM 140, or both. In some examples, the video management agent 146 may send the screen video data to the manageability controller 118 continuously or at regular intervals, which may be temporarily stored in the manageability controller 118.

Further, at block 404, the manageability controller 118 may receive a screen selection input from a user via a local input device (e.g., the keyboard 104), the web-console accessible from the remote computing system 108, or both. In the example implementation of FIG. 1, the screen selection input may be intended to display one of the host OS screen video data corresponding to the host OS 116 or the VM screen video data corresponding to the VM 140. In some examples, options to select a screen video may be presented on the display 106 and/or the web-console accessible from remote computing system 108 (or any authorized remote computing system connectible to the network 110). The user may select a given screen video, for example, by clicking on a corresponding option or via predefined keyboard shortcuts. Upon selection of the option, the screen selection input may be received by the computing system 102. In some examples, the screen selection input from the keyboard 104 may be received by the host OS 116 and the host OS 116 may relay such screen selection input to the manageability controller 118. Further, if the user accessing the web-console tries to select a given screen video via the web-console, the screen selection input may be received directly by the manageability controller 118 bypassing the host OS 116. The screen selection input may be indicative of an identity of a screen video to be displayed.

Moreover, at block 406, the manageability controller 118 may store any of the host OS screen video data or the VM screen video data in the physical video memory 124 based on the screen selection input. In some examples, from the received screen video data, the manageability controller 118 may select one of the host OS screen video data or the UM screen video data and stored the selected screen video data in the physical video memory 124. Additional details regarding the selection of the host OS screen video data or the VM screen video data are described in conjunction with FIG. 5.

As previously noted, the physical video memory 124 is accessible by the graphics processor 122. The graphics processor 122 may retrieve the screen video data stored in the physical video memory 124, wherein such screen video data may include any of the host OS screen video data or the VM screen video data that is received from the manageability controller 118. The graphics processor 122 may then display the retrieved screen data on the display 106, in one example. Further, in some examples, the if the screen selection input is received from the web-console from the remote computing system 108, the manageability controller 118 may transmit the selected screen video data to the remote computing system 108 over the network 110 and the selected screen video data may be displayed on the web-console. For example, if the user selects to view the VM screen video corresponding to the VM 140, the manageability controller 118 may send the selected VM screen video data to the remote computing system 108 where the VM screen video may be displayed on the web-console without the user accessing the VM 140 via any VM management application.

Figure 5:
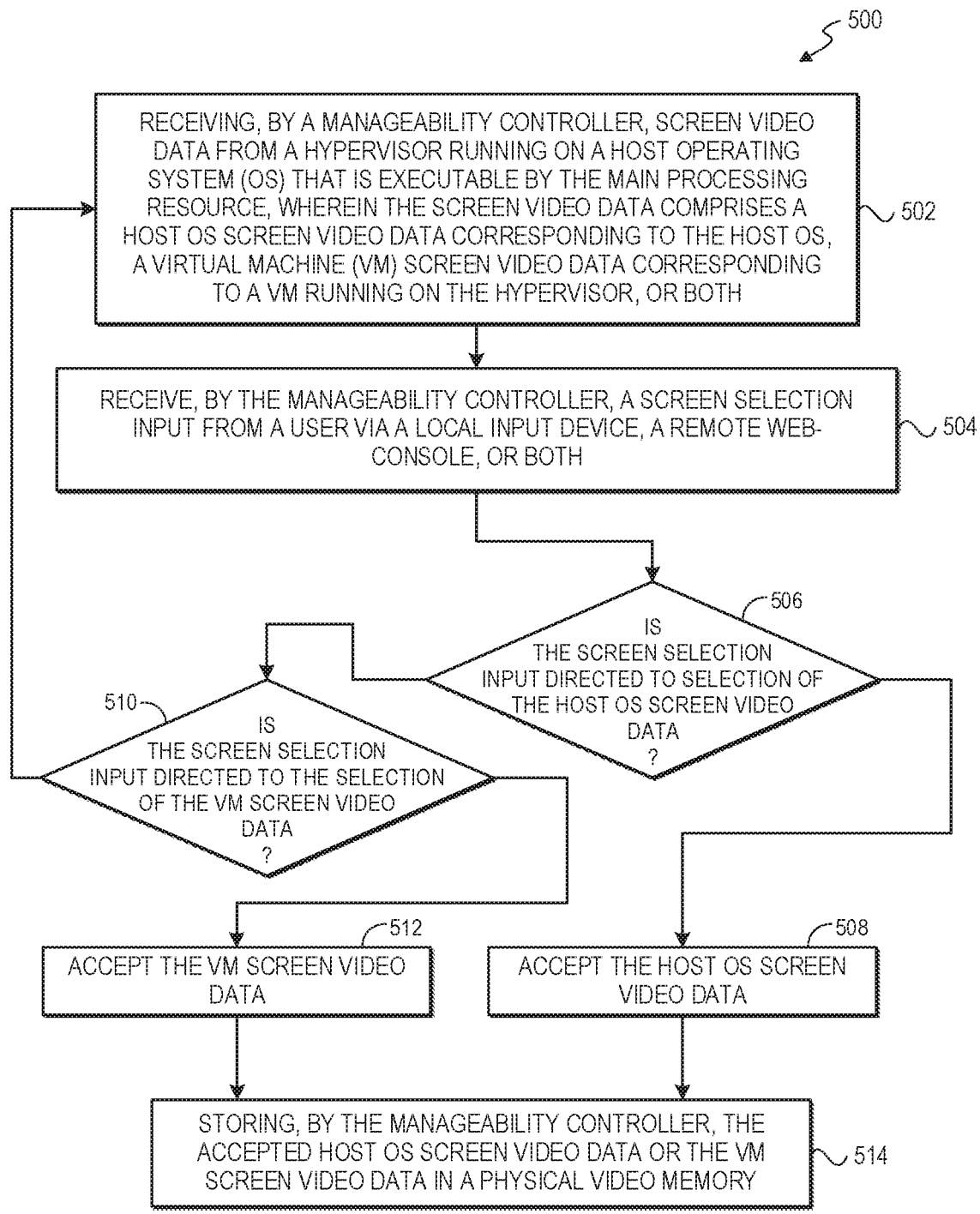
FIG. 5 is a flow diagram depicting a method for controlling a display of a screen video by a manageability controller, in accordance with another example.

Turning now to FIG. 5, a flow diagram depicting a method 500 for controlling a display of a screen video is depicted, in accordance with another example. The method 500 of FIG. 5 may represent one example of the method 400 of FIG. 4 and provide certain additional method blocks to the method 400 of FIG. 4. By way of example, the method 500 may include blocks 502, 504, 506, 508, 510, 512, and 514 (hereinafter collectively referred to as blocks 502-514). Further, the blocks 502, 504, and 514 of FIG. 5 may be similar to the method blocks 402, 404, and 406, respectively, of FIG. 4, certain description of which is not repeated. Further, the method at blocks 502-514 may be performed by a processor-based system, for example, the manageability controller 118. In particular, operations at each of the method blocks 402-406 may be performed by the manageability processing resource 302 of the manageability controller 118.

In brief, at block 502, the manageability controller 118 may receive the screen video data including the host OS screen video data and/or the UM screen video data from the video management agent 146. Further, at block 504, the manageability controller 118 may receive the screen selection input. Furthermore, at block 506, the manageability controller 118 may perform a check to determine whether the screen selection input is directed to selection of the host OS screen video data. For example, if the user has chosen the option to view the screen video of the host OS 116, the screen selection input may include an identifier indicative of the selection of the host OS screen video data. The identifier may include a name (e.g., "host OS"), or a combination of the alphabets and/or numerals indicative of the selection of the host OS screen video data. The manageability controller 118 may determine that the screen selection input corresponds to the host OS screen video data based on such identifier in the screen selection input.

At block 506, if it is determined that the screen selection input is directed to select the host OS screen video data, the manageability controller 118, at block 508, may select the host OS screen video data from the screen video data received from the video management agent 146. In some examples, the screen video data received from the video management agent 146 may have corresponding identity information that identifies whether the screen video data is the host OS screen video data or the VM screen video data. For example, the manageability controller 118 may select the host OS screen video data from the incoming screen video data based on such identity information.

However, at block 506, if it is determined that the screen selection input is not directed to select the host OS screen video data, the manageability controller 118, at block 510, may perform another check to determine whether the screen selection input is directed to select the VM screen video data. For example, if the user has chosen the option to view the screen video of the VM 140, the screen selection input may include an identifier indicative of the selection of the VM screen video data. The identifier may include a name (e.g., "VM"), a specific details about a VM if the computing system 102 hosts more than one VMs (e.g., VM1, VM2, and the like—not shown), or a combination of the alphabets and/or numerals indicative of the selection of the VM screen video data. The manageability controller 118 may determine that the screen selection input corresponds to the VM screen video data based on such identifier in the screen selection input.

At block 510, if it is determined that the screen selection input is directed to select the VM screen video data, the manageability controller 118, at block 512, may select the VM screen video data from the screen video data received from the video management agent 146. In some examples, the manageability controller 118 may select the host OS screen video data from the incoming screen video data based on the identity information contained in the screen video data. However, at block 510, if it is determined that the screen selection input is also not directed to select the UM screen video data, the manageability controller 118 continues to receive the screen video data at block 502.

Additionally, at block 514, the manageability controller 118 may store the selected screen video data into the physical video memory 124 based on the screen selection input. For example, the manageability controller 118 may store the host OS screen video data in the physical video memory 124 if the host OS screen video data is selected at block 508. However, the manageability controller 118 may store the VM screen video data in the physical video memory 124 if the VM screen video data is selected at block 512.

Figure 6:
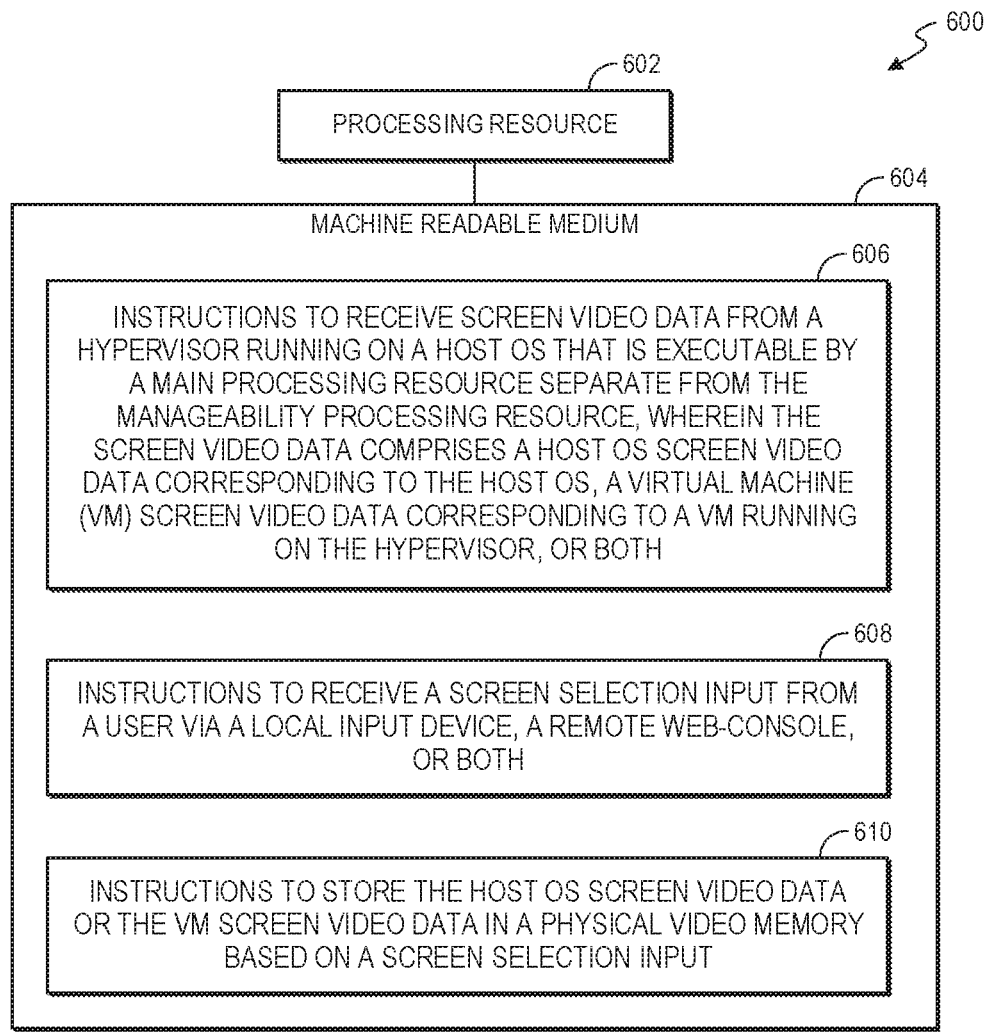
FIG. 6 is a block diagram depicting a processing resource and a machine-readable medium encoded with example instructions to control a display of a screen video, in accordance with an example.

Moving to FIG. 6, a block diagram 600 depicting a manageability processing resource 602 and a machine-readable medium 604 encoded with example instructions to control a display of a screen video, in accordance with an example. The machine-readable medium 604 may be non-transitory and is alternatively referred to as a non-transitory machine-readable medium 604. In some examples, the machine-readable medium 604 may be accessed by the manageability processing resource 602. In some examples, the manageability processing resource 602 may represent one example of the manageability processing resource 302 of the manageability controller 118 shown in FIG. 3. Further, the machine-readable medium 604 may represent one example of the machine-readable medium 304 of the manageability controller 118 shown in FIG. 3.

The machine-readable medium 604 may be any electronic, magnetic, optical, or other physical storage device that may store data and/or executable instructions. Therefore, the machine-readable medium 604 may be, for example, RAM, an EEPROM, a storage drive, a flash memory, a CD-ROM, and the like. As described in detail herein, the machine-readable medium 604 may be encoded with executable instructions 606, 608, and 610 (hereinafter collectively referred to as instructions 606-610) for performing the method 400 described in FIG. 4. Although not shown, in some examples, the machine-readable medium 604 may be encoded with certain additional executable instructions to perform the method 500 of FIG. 5, without limiting the scope of the present disclosure.

The manageability processing resource 602 may be a physical device, for example, one or more CPU, one or more semiconductor-based microprocessor, ASIC, FPGA, other hardware devices capable of retrieving and executing the instructions 606-610 stored in the machine-readable medium 604, or combinations thereof. In some examples, the manageability processing resource 602 may fetch, decode, and execute the instructions 606-610 stored in the machine-readable medium 604 to control display of the screen video thereby enabling KVM like capability for accessing one or more VMs (e.g., the VM 140) and the host OS 116 without the user accessing the VMs via any VM management application. In certain examples, as an alternative or in addition to retrieving and executing the instructions 606-610, the manageability processing resource 602 may include at least one IC, other control logic, other electronic circuits, or combinations thereof that include a number of electronic components for controlling the display of the screen videos.

Further, the instructions 606 when executed by the manageability processing resource 602 may cause the manageability processing resource 602 to receive the screen video data from the hypervisor 132, wherein the screen video data may include the host OS screen video data corresponding to the host OS 116, the VM screen video data corresponding to the VM 140, or both. Further, the instructions 608 when executed by the manageability processing resource 602 may cause the manageability processing resource 602 to receive the screen selection input from the user via a local input device (e.g., the keyboard 104), the web-console, or both. Furthermore, in some examples, the instructions 610 when executed by the manageability processing resource 602 may cause the manageability processing resource 602 to store any one of the host OS screen video data or the VM screen video data in the physical video memory 124 based on the screen selection input.

As will be appreciated, in accordance with the aspects of the present disclosure, the manageability controller 118 in conjunction with the hypervisor 132 enables the user to switch between the host OS screen video and the VM screen video without the user accessing any VM management application. This is achieved party as the screen video data corresponding to the host OS is stored in virtualized storage (e.g., the host OS VSR 136). Further, the hypervisor 132 sends the screen video data to the manageability controller 118. In accordance with the aspects of the present disclosure, the manageability controller 118 decides what is loaded in the physical video memory 124 based on the screen selection input. Moreover, since the manageability controller 118 is in control of selection of the screen video, the manageability controller 118 can also display the selected screen video on the web-console enabled by the manageability controller 118. Advantageously, a user, remotely from the web-console or locally at the computing system 102, can access screen videos of any of the host OS 116 or the VM 140 without using any VM management application.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

We claim:
1. A manageability controller comprising:
a non-transitory machine-readable medium storing instructions; and
a manageability processing resource coupled to the non-transitory machine-readable medium, the instructions executable on the manageability processing resource to:
receive, at the manageability controller, screen video data from a hypervisor running on a host operating system (OS) that is executable by a main processing resource separate from the manageability processing resource, wherein the screen video data comprises host OS screen video data of the host OS, and virtual machine (VM) screen video data of a VM running on the hypervisor, wherein the host OS screen video data is provided by the host OS, and the host OS screen video data received at the manageability controller is obtained by a video driver of the hypervisor from a first virtual storage region created by the host OS, and wherein the hypervisor comprises a video management agent to access the host OS screen video data from the first virtual storage region and the VM screen video data from a second virtual storage region;
receive, by the manageability controller, a screen selection input from a user via a local input device or a web-console accessible from a remote computing system; and
store the host OS screen video data and the VM screen video data in a physical video memory based on the screen selection input.

2. The manageability controller of claim 1, wherein the storing of the host OS screen video data of the host OS in the first virtual storage region virtualizes the host OS screen video data.

3. The manageability controller of claim 1, wherein the first virtual storage region and the second virtual storage region are allocated separate storage space of a kernel memory associated with the host OS.

4. The manageability controller of claim 1, wherein the host OS screen video data and the VM screen video data received at the manageability processing resource from the hypervisor is encoded by the video management agent in accordance with a video encoding protocol.

5. The manageability controller of claim 1, wherein the instructions are executable on the manageability processing resource to:
determine that the screen selection input comprises a selection of the host OS screen video data; and
select, in response to determining that the screen selection input comprises the selection of the host OS screen video data, the host OS screen video data to store in the physical video memory.

6. The manageability controller of claim 1, wherein the instructions are executable on the manageability processing resource to:
determine that the screen selection input comprises a selection of the VM screen video data; and
select, in response to determining that the screen selection input comprises the selection of the VM screen video data, the VM screen video data to store in the physical video memory.

7. The manageability controller of claim 1, wherein the instructions are executable on the manageability processing resource to display the host OS screen video data or the VM screen video data on the web-console based on the screen selection input.

8. The manageability controller of claim 1, wherein the physical video memory is accessible by a graphics processor to display, on a display device, a video corresponding to the host OS screen video data stored in the physical video memory by the manageability processing resource, and wherein the manageability controller is to store the host OS screen video data in the physical video memory instead of the host OS.

9. A method comprising:
receiving, by a manageability controller separate from a main processing resource of a computing system, screen video data from a hypervisor running on a host OS that is executable by the main processing resource, wherein the screen video data comprises host OS screen video data corresponding to the host OS and VM screen video data corresponding to a VM running on the hypervisor, wherein the host OS screen video data is provided by the host OS, and the host OS screen video data received at the manageability controller is obtained by a video driver of the hypervisor from a first virtual storage region created by the host OS, and wherein the hypervisor comprises a video management agent to access the host OS screen video data from the first virtual storage region and the VM screen video data from a second virtual storage region;
receiving, by the manageability controller, a screen selection input from a user via a local input device or a web-console accessible from a remote computing system; and
selectively storing, by the manageability controller, the host OS screen video data or the VM screen video data in a physical video memory based on the screen selection input.

10. The method of claim 9, further comprising:
determining that the screen selection input comprises a selection of the host OS screen video data; and
selecting, in response to determining that the screen selection input comprises the selection of the host OS screen video data, the host OS screen video data to store in the physical video memory.

11. The method of claim 9, further comprising:
determining that the screen selection input comprises a selection of the VM screen video data; and
selecting, in response to determining that the screen selection input comprises the selection of the VM screen video data, the VM screen video data to store in the physical video memory.

12. The method of claim 9, wherein the manageability controller stores the host OS screen video data in the physical video memory instead of the host OS.

13. A non-transitory machine-readable medium storing instructions executable by a manageability controller separate from a main processing resource executing a host operating system (OS) to:
receive, at the manageability controller, screen video data from a hypervisor running on the host OS, wherein the screen video data comprises host OS screen video data corresponding to the host OS and VM screen video data corresponding to a VM running on the hypervisor, wherein the host OS screen video data is provided by the host OS, and the host OS screen video data received at the manageability controller is obtained by a video driver of the hypervisor from a first virtual storage region created by the host OS, and wherein the hypervisor comprises a video management agent to access the host OS screen video data from the first virtual storage region and the VM screen video data from a second virtual storage region;
receive, at the manageability controller, a screen selection input from a user via a local input device or a web-console accessible from a remote computing system; and
store the host OS screen video data or the VM screen video data in a physical video memory based on the screen selection input.

14. The non-transitory machine-readable medium of claim 13, further comprising instructions executable by the manageability controller to select, in response to determining that the screen selection input comprises the selection of the host OS screen video data, the host OS screen video data to store in the physical video memory.

15. The non-transitory machine-readable medium of claim 13, further comprising instructions executable by the manageability controller to select, in response to determining that the screen selection input comprises the selection of the VM screen video data, the VM screen video data to store in the physical video memory.

16. The non-transitory machine-readable medium of claim 13, wherein the manageability controller stores the host OS screen video data in the physical video memory instead of the host OS.

* * * * *